July 5, 1966  B. BEDETTI  3,259,772
COLD CATHODE GAUGE FOR MEASURING VACUUM
Filed Dec. 23, 1963

INVENTOR.
BRUNO BEDETTI
BY 3,259,772
COLD CATHODE GAUGE FOR MEASURING
VACUUM
Bruno Bedetti, Brookline, Mass., assignor to National Research Corporation, Cambridge, Mass., a corporation of Massachusetts
Filed Dec. 23, 1963, Ser. No. 332,598
5 Claims. (Cl. 313—7)

The present invention relates to Penning gauges—cold cathode ionization gauges made according to U.S. Patent 2,197,079, granted to F. M. Penning in 1940, and widely used for measuring vacuum pressures.

It is the object of the present invention to provide a new construction of Penning gauges, which is less vulnerable to contamination than prior art Penning gauges, has a fast response to varying vacuum system pressures and a linear calibration of amperes/torr in the $10^{-8}$ to $10^{-4}$ torr range and has a fast startup at low pressures.

The object is accomplished by a new cathode construction for the Penning gauge which comprises a double looped wire, the loops forming two cathodes bracketing the anode. Prior art Penning gauges utilize cathode plates or discs. The new construction has a minimum surface area exposed to dirt in the vacuum system. It presents less impedance to gas flow and allows a wider opening between the gauge and vacuum system for faster response. The new construction also makes it possible to cut the cost of the gauge tube and electrodes in half so that the gauge is disposable; it can be replaced rather than serviced.

Other objects and advantages of the invention will be obvious from the more complete description below.

The invention accordingly comprises as an improved article of manufacture the new construction of Penning gauge.

Reference should be had to the following detailed description of a preferred embodiment taken together with the accompanying drawings, wherein.

Figure 1:
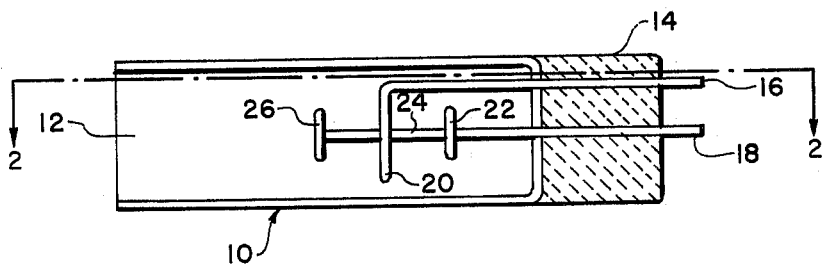
FIG. 1 is a partly sectional side view of the new cathode construction.

Referring now to FIG. 1, the gauge comprises a glass tube 10 which is fully open at one end 12 and pressed closed at the other end 14. An anode wide 16 and a cathode wire 18 are encased in the pressed closure. The anode wire extends into the tube and terminates in an anode loop 20 within the tube. The cathode wire extends into the tube and is formed as a first cathode loop 22, then as a connecting link 24 and then terminates as a second cathode loop 26.

Figures 2, 3:
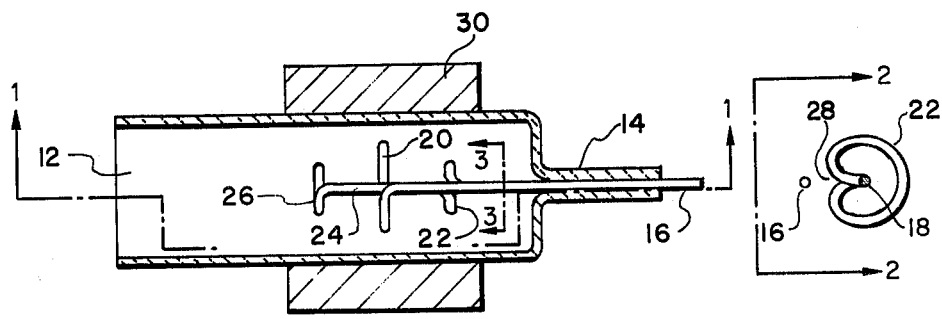
FIG. 2 is a partly sectional top view of the improved Penning gauge.
FIG. 3 is a detailed transverse view showing the relative position of cathode and anode wires, the relationship of the three views to each other being indicated by the viewing lines wherein 1—1 refers to FIG. 1, 2—2 (both instances) refers to FIG. 2, and 3—3 refers to FIG. 3.

It should be noted that the three loop axes coincide with the tube axis. The straight portion of the cathode wire 18 coincides with the tube axis and the straight portion of anode wire 16 is parallel to the axis and offset therefrom. Referring to FIGS. 2 and 3, it can be seen that a saddle 28 is formed in loop 22. The desired electrical field for the gauge is nevertheless maintained by locating the saddle 28 in close proximity to the anode wire and between the straight portions of anode and cathode wires.

The glass tube is preferably made of 7750 glass. The open end 12 can be fused to a glass system. The tube glass must be graded if it is to be fused to a Pyrex system. The glass tube can also be fused to a Kovar cylinder without grading and the Kovar in turn can be mounted on a port of a metal vacuum system. The glass tube is bakeable with the vacuum system up to 450° C. A cylindrical magnet 30 is fitted over the glass tube to surround the portion of the tube containing the wire loops. The magnet can be supported between two nylon rings (not shown) which can be fitted on the tube on opposite sides of the magnet. Alnico 8 alloy is preferred for the magnet material because of its light weight and high temperature stability.

In the preferred embodiment, the tube is made of 1.5 mm. thick glass. The anode and cathode wires are .047" diameter molybdenum wires. The cathode loops, 22, 26 are each spaced about ⅜ inch from the anode loop 20. The outer diameter of the cathode loops is $9/16$ inch and the outer diameter of the anode loop is $13/16$ inch. A gauge built according to these dimensions has been operated in the $10^{-8}$ torr to $10^{-4}$ torr ranges of pressure with a sensitivity of one ampere ion current per torr at an operating voltage of 2100 v. D.C. and a magnetic field strength of 850 gauss.

The tube has also been made with wires $3/32$ inch in diameter and has been then been operated at a sensitivity of three amperes per torr.

While a preferred embodiment of the invention has been described above, it should be understood that other forms of the gauge can be made, which in some circumstances would be suitable. For instance, the electrode wires could be tungsten instead of molybdenum. The wires could be entirely within the tubes and spot welded to leads pressed in glass closure 14. Banana plug leads could be used to support wires. A metal gauge tube could be provided with insulated feedthroughs, supporting the lead wires at the base of the tube. Where a Kovar inlet tube is used with a glass tube, an aluminum clamp connected to the Kovar can support the magnet instead of the nylon rings described above.

Since variations can be made within the scope of the present invention, in addition to those described above, it is intended that the above description shall be read as illustrative and not in a limiting sense.

What is claimed is:

1. A Penning gauge comprising an anode loop bracketed by two cathode loops, the three loops being made of wire and coaxial with each other, said wire loop structure being mounted in a tubular gauge body with an electrical feedthrough at one end connecting the cathodes and anode to external wiring and a full open gas inlet at the other end for connection to a vacuum system, said loop axis being parallel to the axis of said tubular body, and a tubular magnet surrounding the portion of the tube containing the loops, for producing an axial magnetic field through the loops.

2. A Penning gauge comprising the wire loop structure of claim 1 with a feedthrough comprising lead wires pressed in glass and connected to the loops.

3. The construction of claim 2 wherein the lead wires comprise extensions of the loop wires.

4. A Penning gauge consisting of a tubular body member of glass having one end fully open and the other end pressed to a flat closure, anode and cathode wires pressed within said closure apart from each other and passing through said closure into the tube, the anode wire extending parallel to the axis of the tube and apart from said axis and terminating in a loop having its axis coincident with the tube axis, the cathode wire extending down the axis of the tube and having a first cathode loop between the closed end of the tube and the anode wire loop and terminating in a second cathode loop beyond the end of the anode loop, the first cathode wire loop having a saddle adjacent the anode wire, the cathode wire loop axes coinciding with the tube axis, and a tubular magnet surrounding the portion of the tube containing the loops, for producing an axial magnetic field through the loops.

5. The gauge of claim 4 wherein the wires are made of molybdenum.

References Cited by the Examiner

UNITED STATES PATENTS

| | | | |
|---|---|---|---|
| 2,078,360 | 4/1937 | Ziegenbein | 313—344 |
| 2,381,012 | 8/1945 | Stutsman. | |
| 2,988,657 | 6/1961 | Klopfer | 313—7 |
| 3,054,430 | 9/1962 | Van Tol | 140—71.5 |

GEORGE N. WESTBY, *Primary Examiner.*

ROBERT SEGAL, *Examiner.*

S. D. SCHLOSSER, *Assistant Examiner.*